(12) United States Patent
Shi et al.

(10) Patent No.: US 8,200,034 B2
(45) Date of Patent: Jun. 12, 2012

(54) DETECTING DOUBLE JPEG COMPRESSION IN IMAGES

(75) Inventors: Yun-Qing Shi, Millburn, NJ (US); ChunHua Chen, Matawan, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 720 days.

(21) Appl. No.: 12/422,683

(22) Filed: Apr. 13, 2009

(65) Prior Publication Data

US 2009/0257656 A1 Oct. 15, 2009

Related U.S. Application Data

(60) Provisional application No. 61/044,598, filed on Apr. 14, 2008.

(51) Int. Cl.
G06K 9/36 (2006.01)
G06K 9/46 (2006.01)

(52) U.S. Cl. ........................................................ 382/250

(58) Field of Classification Search .................. 382/100, 382/166, 228, 235, 250, 275, 286
See application file for complete search history.

(56) References Cited

U.S. PATENT DOCUMENTS 7,439,989 B2 * 10/2008 Lin et al. ........................ 345/629
7,720,288 B2 * 5/2010 Luo et al. ....................... 382/191

OTHER PUBLICATIONS

Chen, et al., "A machine learning based scheme for double JPEG compression detection," Dec. 2008, International Conference on Pattern Recognition (ICPR08), Tampa, FL, USA, 4 pages.
Fu, et al., "A Generalized Benford's Law for JPEG Coefficients and its Applications in Image Forensics," 2007, SPIE Electronic Imaging, San Jose, CA, USA, 11 pages.
Lukáš, et al., "Estimation of Primary Quantization Matrix in Double Compressed JPEG Images," Aug. 2003, Digital Forensic Research Workshop, Cleveland, OH, USA, 17 pages.
Popescu, A., "Statistical tools for digital image forensics", Dec. 2004, Thesis Computer Science, Dartmouth College, Hanover, NH. http://www.cs.dartmouth.edu/farid/publications/apthesis05.pdf., 137 pages.

* cited by examiner

*Primary Examiner* — Phuoc Tran
(74) *Attorney, Agent, or Firm* — Hope Baldauff Hartman, LLC

(57) ABSTRACT

Techniques are generally described for detecting double JPEG compression in images. Example detection techniques of double JPEG compression may include receiving JPEG images for analysis and extracting 2-dimensional (2-D) arrays of JPEG coefficients from the images. 2-D difference arrays may be generated from the array of JPEG coefficients, with the entries in the difference array reflecting relative changes in values of pairs of entries in the array of JPEG coefficients. The detection techniques also model the difference arrays using random processes, and evaluate whether the random processes reveal statistical artifacts in the JPEG images. These statistical artifacts result from double JPEG impression performed on the JPEG images.

20 Claims, 9 Drawing Sheets

DETECTING DOUBLE JPEG COMPRESSION IN IMAGES

PRIORITY CLAIM AND CROSS-REFERENCE TO RELATED APPLICATION

This application claims the benefit of the filing date of U.S. Provisional Patent Application Ser. No. 61/044,598, entitled "Markov Process Approach to Identifying Double JPEG Compression", filed on Apr. 14, 2008 (hereinafter referred to as 'Related Application'), to the fullest extent permitted under 35 USC §119(e). All subject matter contained within the Related Applications is incorporated herein by this reference as if set forth verbatim herein, to the extent such subject matter is not inconsistent herewith.

BRIEF DESCRIPTION OF THE FIGURES

The foregoing and other features will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
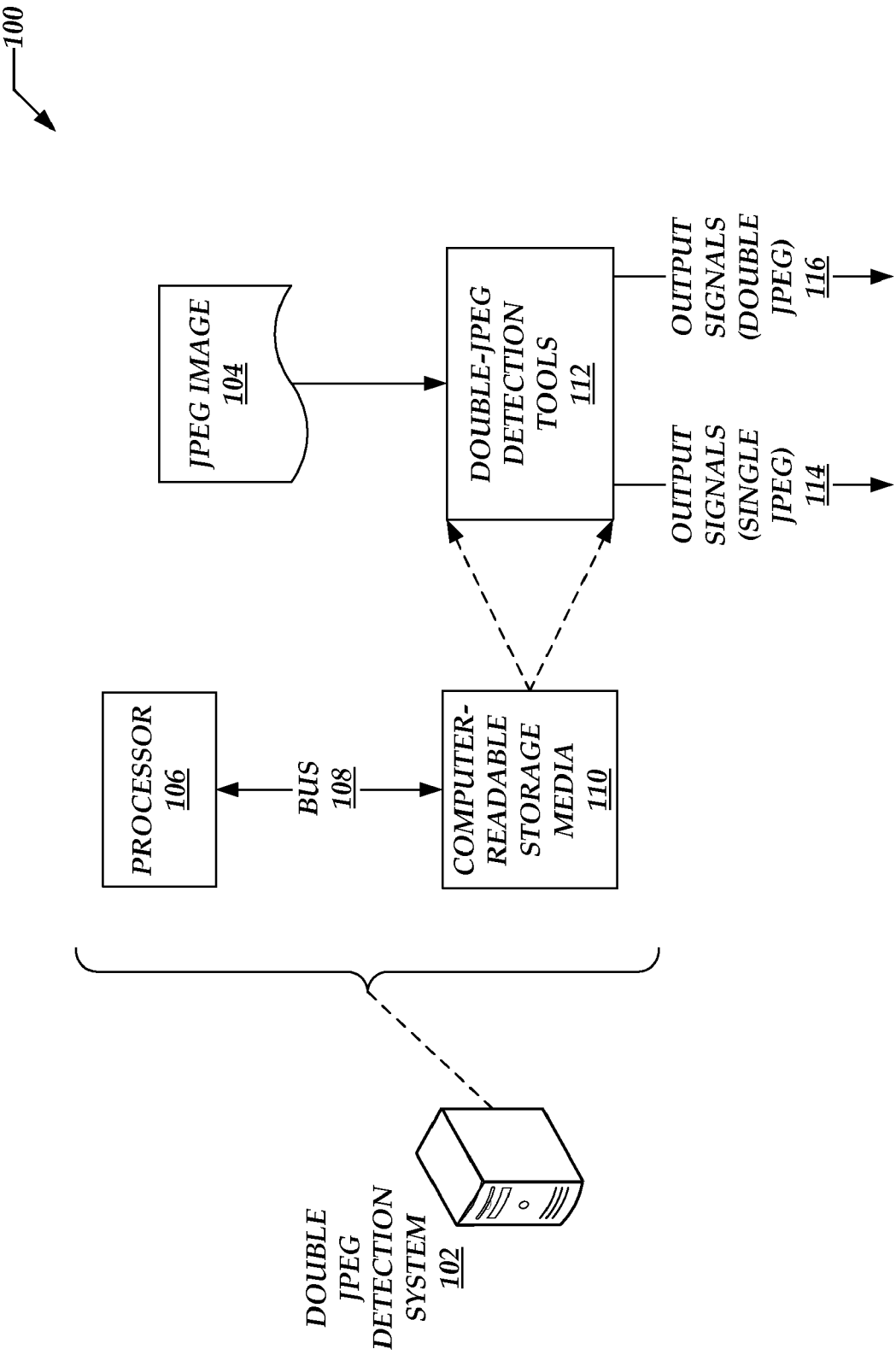
FIG. 1 is a block diagram illustrating an example process and operating environment for double JPEG detection systems to detect compression in images.

In the following detailed description, reference is made to the accompanying drawings, which form a part hereof. In the drawings, similar symbols typically identify similar components, unless context dictates otherwise. In addition, the first digit of the symbols generally indicates the drawing in which this symbol first appears. For example, the symbol "202" would refer to an element shown for the first time in FIG. 2. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Described herein, inter alia, are methods, apparatus, computer programs and systems related to Joint Photographic Experts Group (JPEG) image compression. Techniques and examples generally described for detecting double JPEG compression in images. Example detection techniques of double JPEG compression may include receiving JPEG images for analysis and extracting 2-dimensional (2-D) arrays of JPEG coefficients from the images. 2-D difference arrays may be generated from the array of JPEG coefficients, with the entries in the difference array reflecting relative changes in values of pairs of entries in the array of JPEG coefficients. The detection techniques also model the difference arrays using Markov random processes, and evaluate whether the Markov random processes reveal statistical artifacts in the JPEG images. These statistical artifacts result from double JPEG compression performed on the JPEG images.

A double compressed JPEG image is a JPEG image that has been compressed once more by another JPEG compression operation. In some cases, a quality factor (QF) in the second JPEG compression is different from a quality factor in the first JPEG compression. As understood from reading this description, the JPEG images processed using the tools and techniques described herein may represent any number of different physical objects. In turn, the processes, tools, and techniques described herein may manipulate or transform these representations of physical objects.

Images may experience double JPEG compression in a variety of circumstances. In some cases, people may edit images for different reasons, for example, saving a JPEG image with a smaller quality factor in order to save storage and thus make the JPEG image publishable on the web. In other cases, malicious users may tamper with digital images. Image editing, whether innocent or malicious in nature, has become more widespread recently, with the advent and availability of increasingly sophisticated photo-editing application software. In cases of image tampering, malicious users may apply another JPEG compression to the tampered image, to simulate an authentic image and to hide the effects of tampering.

As understood from the foregoing discussion, analysis of double JPEG compression may tell the history or lineage of a given image. This historical information may be useful for digital forensics. In other scenarios, double JPEG compression may play a role in steganalysis.

Turning now to the drawings, FIG. 1 is a block diagram illustrating an example process 100 and operating environment for double JPEG detection systems to detect compression of images in accordance with the present disclosure. An example double JPEG detection system 102 may receive as input as one or more instances of JPEG images 104. The term "JPEG image or images" refers to images that comply with standards promulgated by the Joint Photographic Experts Group (JPEG).

Turning to the double JPEG detection systems 102 in more detail, implementations of these systems 102 may include one or more processors 106, which may have a particular type or architecture, chosen as appropriate for particular implementations. The processors 106 may couple to one or more bus systems 108 chosen for compatibility with the processors 106.

The systems 102 may also include one or more instances of computer-readable storage medium or media 110, which communicate over one or more bus systems 108. The bus systems 108 may enable the processors 106 to transfer (i.e., read or write) code and/or data to/from the computer-readable storage media 110. The media 110 may represent apparatus in the form of storage elements that may be implemented using any suitable technology, including but not limited to semiconductor devices, magnetic material devices, optical devices, or the like. For example, the media 110 may include memory components, whether classified as RAM, ROM, flash, or other types, or may represent hard disk drives (HDDs). Further examples of the media 110 may include removable media, such as compact disk read-only memories (CD-ROMs), digital versatile disks or digital video disks (DVDs), removable storage media communicating through a universal serial bus (USB) interface, or the like.

The storage media 110 may be arranged to store and/or provide one or more modules of instructions that, when loaded into the processor 106 and executed, may cause the systems 102 to perform various techniques related to detecting double JPEG compression in images. As detailed throughout this description, these modules of instructions may also provide various means, tools, or techniques, denoted generally at 112, by which the double JPEG detection systems 102 may analyze and process suspect media. The double JPEG detection tools 112 generally represent the components, flows, and data structures discussed in more detail throughout this description, with the subsequent drawings and description understood as elaborating on various aspects of the double JPEG detection tools 112.

Turning to the double JPEG detection tools 112 in more detail, these tools may receive as input any number of JPEG images 104, and perform the analytical processing described herein on these input images. Based on the results of this processing, the double JPEG detection tools 112 may activate or assert output signals indicating whether the JPEG image 104 has undergone or experienced double JPEG compression. For example, the double JPEG detection tools 112 may assert a first set of output signals 114 indicating that the input image 104 is a single JPEG image (i.e. the image is compressed once). Further, the double JPEG detection tools 112 may assert a second set of output signals 116 indicating that the input image 104 is a double JPEG image (i.e. the image is compressed twice). Implementations of the double JPEG detection tools 112 may employ other schemes for indicating whether the input image 104 is a double JPEG image, without departing from the scope and spirit of the present description.

Figure 2:
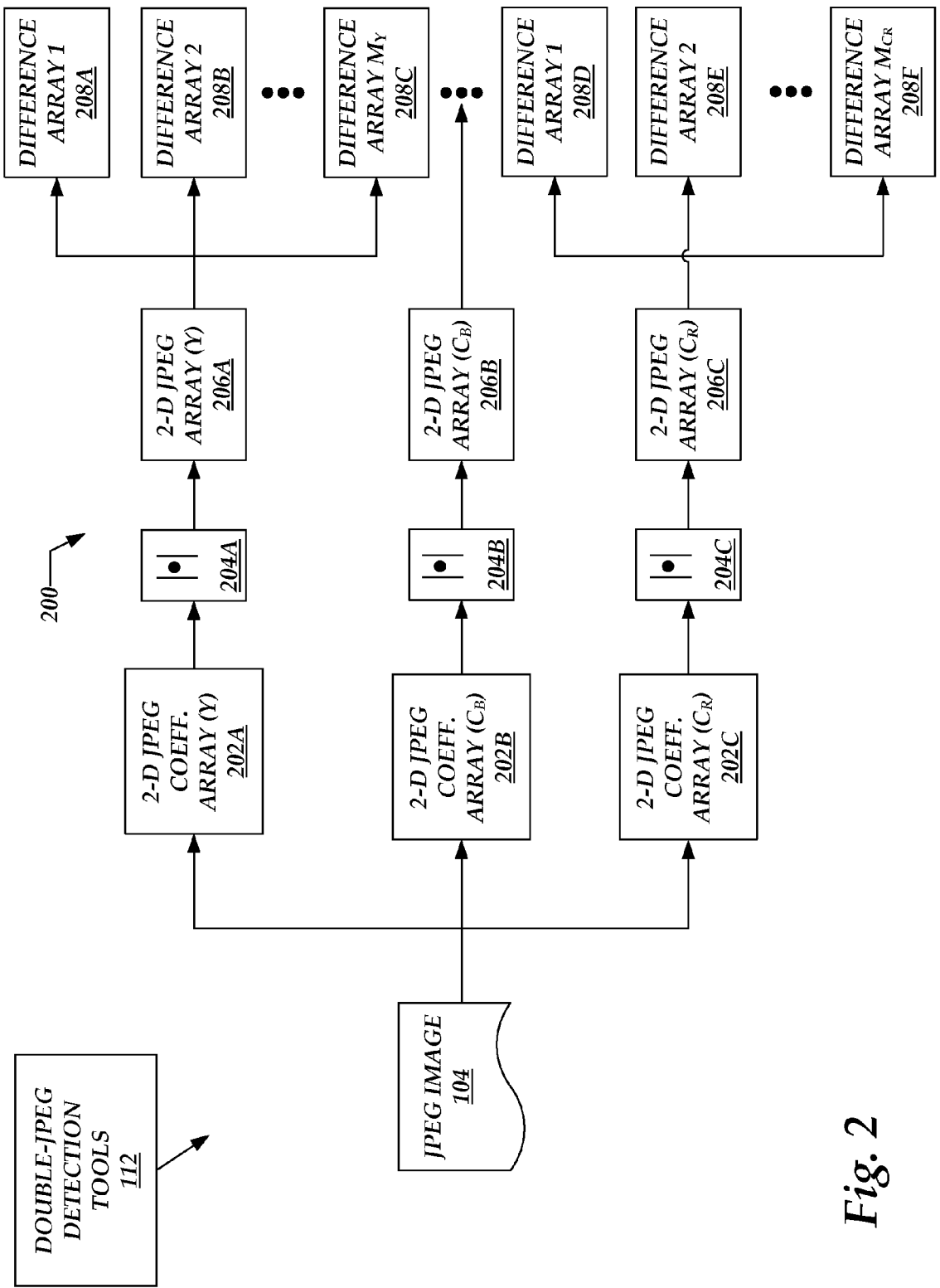
FIG. 2 is a block diagram illustrating additional example process operations for double JPEG compression detection tools.

FIG. 2 is a block diagram illustrating additional example process operations 200 for double JPEG compression detection tools in accordance with the present disclosure. For ease of reference and description, but not to limit possible implementations, FIG. 2 carries forward examples of the JPEG image and the double JPEG detection tools from FIG. 1, and denotes these items at 104 and 112, respectively. As now described in more detail, these JPEG detection tools may provide for extracting features from the input image for analysis.

In FIG. 2, for a given JPEG image, the double JPEG detection tools 112 may extract from the JPEG image 104 one or more arrays of two-dimensional (2-D) JPEG coefficients. In some implementation scenarios, the JPEG image 104 may be a color JPEG image that includes a luminance component Y and two chrominance components $C_b$ and $C_r$. In other implementation scenarios, the JPEG image 104 may be a grayscale JPEG image that includes only a luminance component Y.

Accordingly, depending on the type of the JPEG image 104, the JPEG detection tools 112 may create 2-D JPEG coefficient arrays for the appropriate luminance and/or chrominance components. FIG. 2 provides examples of JPEG coefficient arrays for the luminance and chrominance components, shown respectively at 202A, 202B, and 202C (collectively, JPEG coefficient arrays 202). For convenience and conciseness of description only, this discussion proceeds with a description of the luminance component Y. However, similar processing may apply equally to the chrominance components, with processing of the respective luminance and chrominance components proceeding independently of one another.

Individual coefficients included as elements within the JPEG coefficient arrays 202 may be either positive, or negative, or zero in value. However, implementations of this description may simplify processing by considering only the magnitudes of the values of these coefficients. The following observations may justify this simplification. First, assuming that a single quantization outputs a JPEG coefficient with a given sign, then typically a double JPEG quantization outputs a JPEG coefficient having the same sign. Put differently, JPEG coefficients resulting from single quantization rarely differ in sign from JPEG coefficients resulting from double quantization. Second, as described in further detail below, this description may utilize the magnitude of the difference between a coefficient element and its neighbors. Therefore, once a coefficient element has a sign opposite to that of its neighbor, the difference between them may be significant, and therefore would be truncated by the thresholding operations described further below. In such a circumstance, although the difference between the neighboring coefficient values may expose artifacts of double compression, the difference in the coefficient values may not reflect these artifacts because the thresholding operations would have removed these artifacts.

When analyzing the JPEG coefficients of a given image (specifically, the magnitudes of the JPEG coefficients for that image), the double JPEG detection tools 112 may compute absolute values for the luminance and/or chrominance components of that image. FIG. 2 provides examples of these absolute value computations at 204A, 204B, and 204C (collectively, absolute value computations 204), as performed respectively for these luminance and/or chrominance components of the image. These absolute value computations 204 may result in transformed JPEG 2-D arrays 206A, 206B, and 206C (collectively, JPEG 2-D arrays 206) that represent the magnitudes of elements in the 2-D JPEG coefficient arrays 202.

For any given JPEG 2-D array 206, the double JPEG detection tools 112 may generate any number of difference arrays. In the example shown in FIG. 2, the difference arrays 208A, 208B, and 208C can be generated for the JPEG 2-D array 206A, while the difference arrays 208D, 208E, and 208F may be generated for the JPEG 2-D array 206C. In addition, the double JPEG detection tools 112 may generate difference arrays for the JPEG 2-D array 206B as well (not shown in FIG. 2). Subsequent description may refer to the difference arrays 208A-208F collectively as difference arrays 208.

Turning to the difference arrays 208 in more detail, difference reflects the relative change between two elements. In nature, statistics derived from differences are in the second order. Second order statistics are distinguished from first order statistics. For instance, the histogram of a digital image may represent first order statistics relating to that digital image. As a first order statistic, the histogram may relate to the values of pixels in that image, but may not relate to the positions of those pixels within the image. However, second order statistics, such as a Markov process, may relate to the positions of the pixels within the image. More specifically, this description capitalizes on these second order statistics to detect double JPEG compression. Hence, as described in further detail below, artifacts resulting from double JPEG compression may be enhanced by observing the differences between an element and its neighbors in the JPEG 2-D array.

Figure 6:
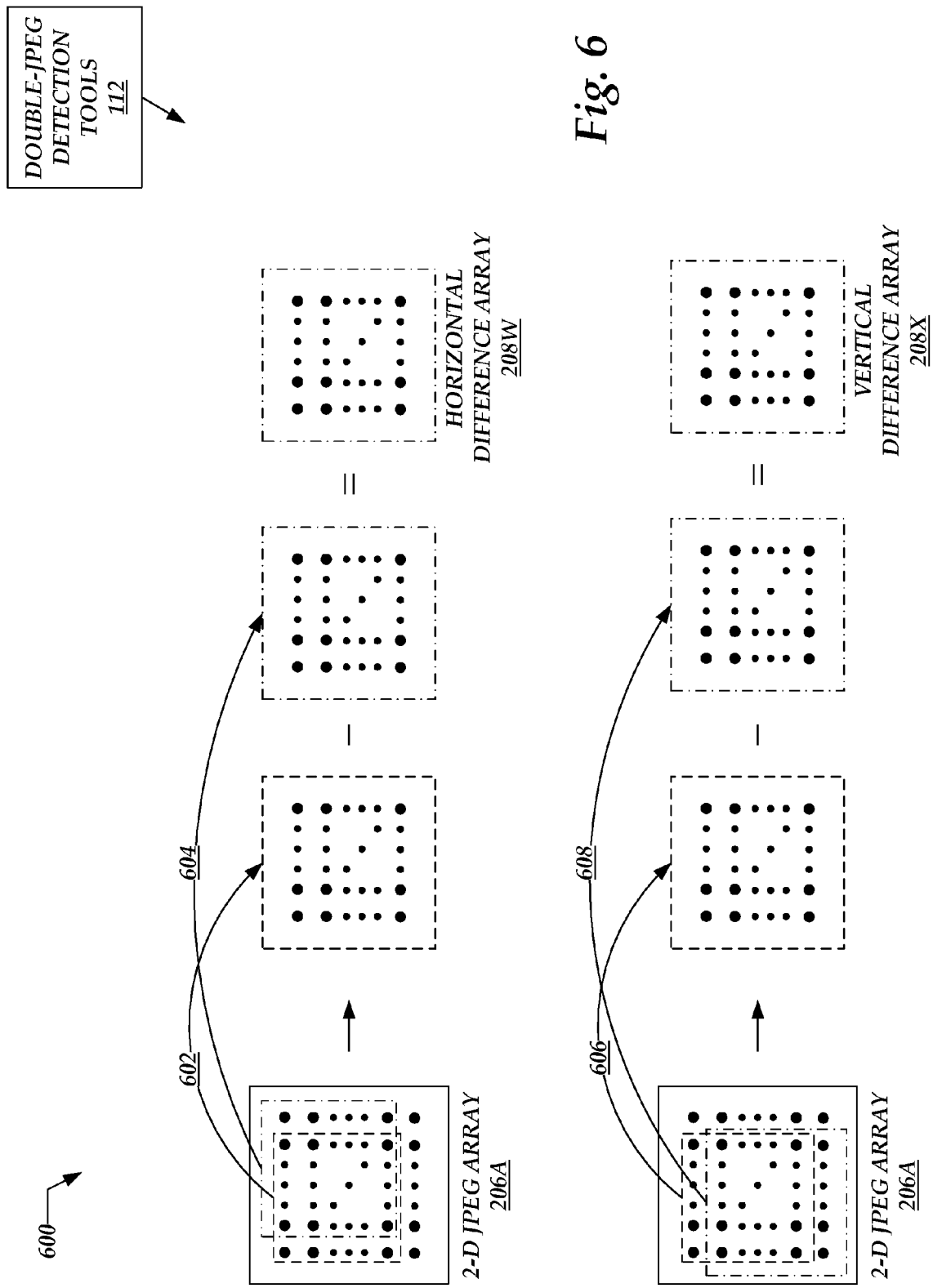
FIGS. 6 and 7 are block diagrams illustrating examples of generating horizontal, vertical, main diagonal, and minor diagonal difference arrays for the 2-D JPEG image.

The JPEG 2-D array generated from a given image can be denoted by $F(u,v)=(u\in[0,S_h-1],v\in[0,S_v-1])$, where $S_h$ is the size of the JPEG 2-D array in a horizontal direction and $S_v$ in a vertical direction. Then, as shown in FIG. 6 described below, the double JPEG detection tools 112 may generate the 2-D difference arrays 208 according to Equation 1) as follows:

$$F_h(u,v)=F(u,v)-F(u+1,v), \quad 1)$$

where $F_h(u,v)$ is called the horizontal difference 2-D array.

To utilize the 2-D nature of images in detecting double compression in JPEG images, the double JPEG detection tools 112 may generate difference 2-D arrays along various dimensions or directions. In example implementations, the double JPEG detection tools 112 may define 2-D difference arrays 208 between elements in the 2-D JPEG arrays 206 and the immediate neighbors of these elements. In addition, the double JPEG detection tools 112 may also define 2-D difference arrays 208 between such elements and their faraway neighbors. However, these latter 2-D difference arrays 208 may represent larger distances between neighboring elements and thus may contribute less to detecting double compression, especially when the correlation between an element and its relatively faraway neighbor may decay.

Figure 3:
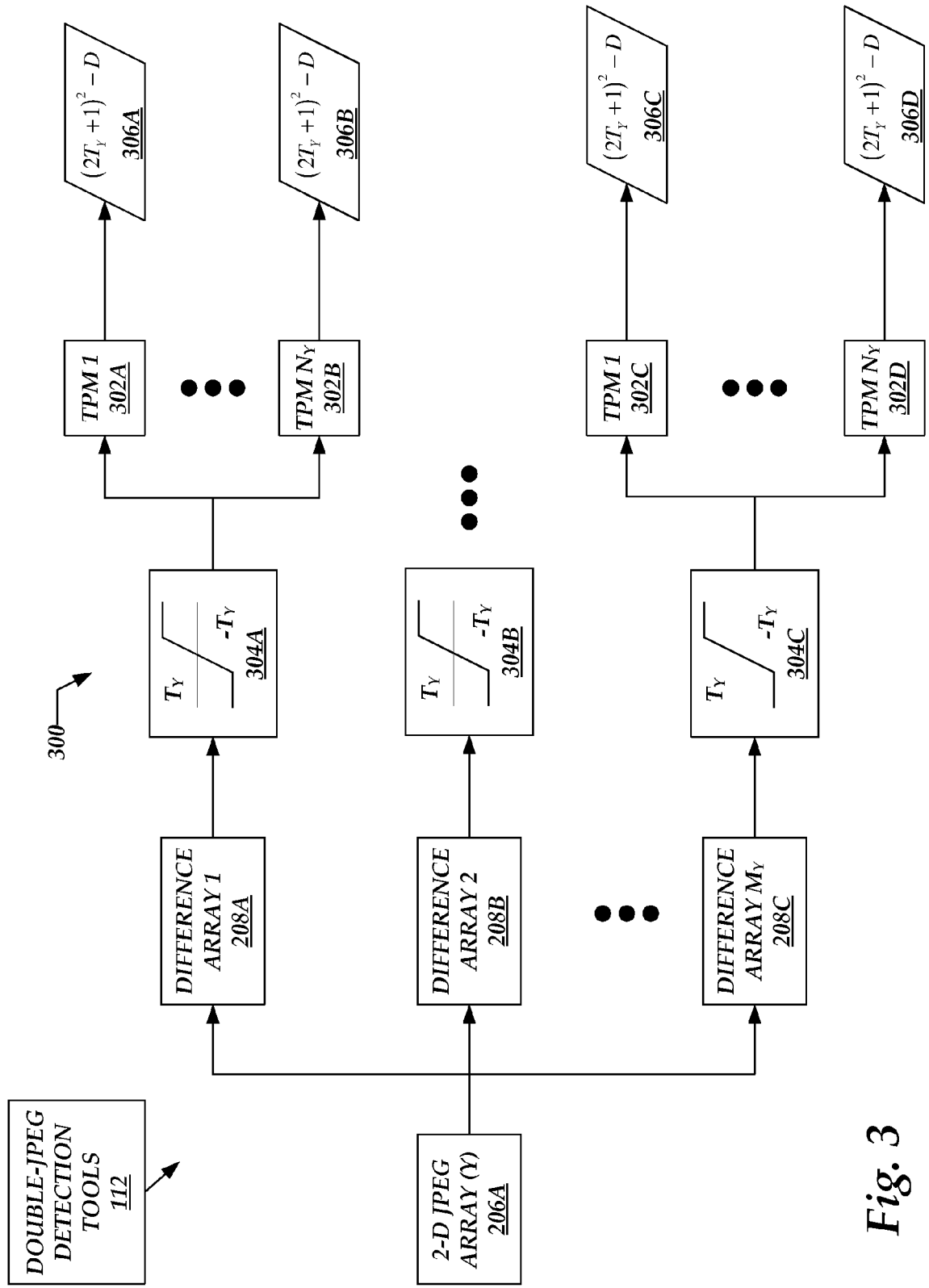
FIG. 3 is a block diagram illustrating example process operations that may be performed for a luminance component of a JPEG image.

FIG. 3 is a block diagram illustrating example process operations 300 that may be performed for a luminance component of a JPEG image in accordance with the present disclosure. Before proceeding further with describing FIG. 3, it is noted the various blocks commonly used for in FIGS. 2 and 3 are only for convenience and clarity of illustration, and are not intended to limit implementations of this description.

Turning to FIG. 3 in more detail, processing related to the difference arrays 208A-208C is shown, where the arrays may be generated for the 2-D JPEG array 206A, all of which may be carried forward from FIG. 2 for convenience of description, but not limitation. The double JPEG detection tools 112 may be arranged to model the above-defined difference JPEG 2-D arrays 208 by using, for example, Markov random processes. According to some theories of random processes, transition probability matrices (TPM) may be used to model or characterize Markov random processes.

FIG. 3 illustrates examples of such TPMs at 302A, 302B, 302C, and 302D (collectively, TPMs 302). In the example shown in FIG. 3, the TPMs 302A and 302B may be generated in connection with the difference array 208A, while the TPMs 302C and 302D may be generated in connection with the difference array 208C. Although omitted from FIG. 3 in the interest of clarity, the double JPEG detection tools 112 may also generate TPMs 302 for the difference array 208b.

Turning to the TPMs 302 in more detail, the TPMs 302 may take the form of one-step TPMs, as well as n-step TPMs. In general, a one-step TPM refers to transition probabilities between two immediately neighboring elements in a given 2-D JPEG difference array 208. An n-step TPM refers to the transition probabilities between two elements separated by (n-1) elements, where $n \geq 2$. Implementations of the double JPEG detection tools 112 may extract $N_T$ transition probability matrices accordingly.

To reduce computational cost further, the double JPEG detection tools 112 may implement thresholding techniques. FIG. 3 represents examples of these thresholding operations at 304A, 304B, and 304C (collectively, thresholding operations 304). The thresholding operations 304A-304C may be performed respectively on the difference arrays 208A-208C.

To perform this thresholding, the double JPEG detection tools 112 may establish a threshold value $T_Y$. If the value of a given element in the 2-D difference arrays 208 is either larger than $T_Y$ or smaller than $-T_Y$, the double JPEG detection tools 112 would represent this value by $T_Y$ or $-T_Y$ correspondingly. These thresholding operations result in a transition probability matrix of $(2T_Y+1) \times (2T_Y+1)$ in size.

The elements of a one-step transition probability matrix associated with a horizontal 2-D JPEG difference array m are given by Equations 2) and 3) as follows:

$$p\{F_h(u+1,v)=n \mid F_h(u,v)=m\} = \frac{\sum_{v=0}^{S_v-2}\sum_{u=0}^{S_h-2}\delta(F_h(u,v)=m, F_h(u+1,v)=n)}{\sum_{v=0}^{S_v-2}\sum_{u=0}^{S_h-2}\delta(F_h(u,v)=m)}, \quad 2)$$

where $$\delta(A) = \begin{cases} 1, & \text{if } A \text{ holds} \\ 0, & \text{Otherwise.} \end{cases} \quad 3)$$

$\delta(A)$ represents the Kronecker delta function, where A is arbitrary input. If A is true, $\delta(A)$ outputs 1. Otherwise, $\delta(A)$ outputs 0.

A given transition probability matrix may contain $(2T_Y+1) \times (2T_Y+1)$ elements. These elements may serve as features for the purposes of detecting double JPEG compression. In light of this description, proper values for a $T_Y$ value may be established by trial and error, trading off desired detection capability against manageable computational complexity.

Effect of Double JPEG Compression on TPMs

Transition Probability Matrix and Second-Order Histogram

The transition probability matrix of a difference 2-D array is closely related to the second-order histogram associated with this difference 2-D array. A second-order histogram may provide a measure of the joint occurrence of pairs of coefficients in a difference 2-D array separated by a specified distance $\rho$ and angle $\theta$ with respect to the horizontal axis. If normalized, a second-order histogram may be the joint distribution of two coefficients separated by $(\rho,\theta)$. For instance, in the difference 2-D array 208W in FIG. 6, the normalized second-order histogram specified by $(\rho,\theta)=(1,0)$ is given by Equations 4) and 5) as follows:

$$p\{F_h(u, v) = m, F_h(u, v+1) = n\} = \frac{\sum_{v=0}^{S_v-2} \sum_{u=0}^{S_u-2} \delta\{F_h(u, v) = m, F_h(u, v+1) = n\}}{(S_u - 1) \times (S_v - 1)}, \quad 4)$$

Its associated transition probability matrix can then be derived as $$p\{F_h(u+1, v) = n \mid F_h(u, v) = m\} = \frac{p\{F_h(u, v) = m, F_h(u, v+1) = n\}}{p\{F_h(u, v) = m\}}, \quad 5)$$

which is also shown in Equation 2) in more detail.

Effect of Double JPEG Compression on TPM

Since the double quantization artifacts may be caused by rounding errors incurred in the process of quantization-de-quantization-(re)quantization, the error 2-D array, defined as the difference between the difference 2-D array of a double JPEG compressed image and that of a single JPEG compressed image, may be modeled as additive random noise. In general, the distribution of the summation of two independent random variables may be expressed as the convolution of the distributions of these two random variables. Assume that the error 2-D array is independent to the difference 2-D array of the single JPEG compressed image. Based on this assumption, the statistical effect of the double JPEG compression on the second-order histogram of the difference 2-D array of a double compressed image makes the second order histogram of a double JPEG compressed image be the convolution of the second-order histogram of the error 2-D array and that of the single compressed JPEG image's difference 2-D array.

As described above in the discussion under the heading "Transition Probability Matrix and Second-Order Histogram", the second-order histogram and its associated transition probability matrix may be closely related. Hence, the double JPEG compression may have a statistical effect on the transition probability matrix according to that of convolution.

elements (in the same positions of each TPM) are calculated, with the results set forth in Table 1. In this table, a number smaller than one means that the corresponding entry in the TPM of the horizontal difference 2-D array of the double JPEG compressed image is smaller than that of the single JPEG compressed image, and vice versa.

In general, implementations of the TPMs may appear similar to Table 1 in organization, except that the elements in the TPMs may represent transition probabilities instead of ratios. In a TPM, the elements in each row may sum up to 1. In general, the element in a TPM corresponding to position (0,0) (i.e., $p\{F_h(u+1,v)=0|F_h(u,v)=0\}$) may have the largest value in the whole matrix, typically much larger than the elements corresponding to positions (0,−2), (0,−1), (0,1), and (0,2). Due to double JPEG compression, in general, the element in position (0,0) of the TPM of the double compressed image will reduce, and the elements in positions (0,−2), (0,−1), (0,1), and (0,2) of the TPM will increase. Since the element in position (0,0) is much larger, the 8.14% decrease of the element in position (0,0) will bring 60% increase to elements in positions (0,−1) and (0,1). As we can see from the bolded entries in Table 1, the TPM spreads from the center towards its neighbors.

TABLE 1

Ratios between the Entries of Two TPMs: Double Compressed Compared To Single Compressed

| | | | | | | $F_h(u+1, v)$ | | | | |
|---|---|---|---|---|---|---|---|---|---|---|
| Ratio | | −4 | −3 | −2 | −1 | 0 | 1 | 2 | 3 | 4 |
| $F_h(u, v)$ | −4 | 0.9938 | 0.9727 | 1.0568 | 0.9061 | 1.1073 | 0.9634 | 1.0280 | 0.9886 | 0.9937 |
| | −3 | 1.0295 | 0.9909 | 1.2252 | 1.1479 | 1.0097 | 0.8636 | 1.0450 | 0.8961 | 1.0620 |
| | −2 | 0.8792 | 0.8043 | 1.0425 | 0.7853 | 0.8223 | 1.2531 | 1.1292 | 0.8356 | 0.9014 |
| | −1 | 1.0921 | 0.8625 | 0.9740 | 1.0610 | 0.9544 | 1.0157 | 1.2035 | 0.8189 | 1.0633 |
| | 0 | 0.9763 | 0.9412 | 1.2020 | 1.6016 | 0.9186 | 1.6171 | 1.2056 | 0.9240 | 0.9243 |
| | 1 | 1.0736 | 0.8211 | 1.2016 | 1.0190 | 0.9533 | 1.0164 | 1.0096 | 0.8988 | 1.1246 |
| | 2 | 0.8747 | 0.8095 | 1.0919 | 1.2722 | 0.8065 | 0.8047 | 1.0800 | 0.8532 | 0.9790 |
| | 3 | 1.0225 | 0.9552 | 1.0208 | 0.9037 | 1.0369 | 1.0303 | 1.2929 | 0.8808 | 1.0033 |
| | 4 | 0.9999 | 0.9907 | 1.0019 | 0.9762 | 1.0338 | 0.9486 | 1.1005 | 0.9543 | 1.0120 |

In general, the histogram (hence, the probability distribution function) of the error 2-D array may be Gaussian-like. Therefore, under the above assumption, compared to the TPM of a difference 2-D array corresponding to a single JPEG compressed image, the TPM of a difference 2-D array corresponding to a double JPEG compressed image will be spread from its center.

Table 1 provides an example of the above statistical spreading. Processes described herein may obtain the TPM of a horizontal difference 2-D array associated with a double JPEG compressed image (with quality factor 70, followed by quality factor 55). These processes may also obtain the TPM of a corresponding single JPEG compressed image (with quality factor 55). The ratios between these two sets of TPM Since double JPEG compression may cause spreading from the center of the TPM of the difference 2-D array, this observed characteristics can be used for detecting statistical evidence of double JPEG compression. In providing the examples shown in Table 1, it is noted that the contents of Table 1 are for illustrative purpose only, and provided only to facilitate description of the statistical evidence of double JPEG compression. However, implementations of this description may result in ratios of TPMs that are different from those shown in Table 1, without departing from the scope and spirit of this description.

As represented generally at 306A-306D, the double JPEG detection tools 112 may collect all the elements of the transition probability matrices (TPMs) 302 as features for detecting double JPEG compression. As shown in FIG. 3, $(2T_Y+1)^2$–D features 306A may be collected for the TPM 302A, $(2T_Y+1)^2$–D features 306B may be collected for the TPM 302B, and so on (where D represents the number of dimensions processed in a given image. As described above, $T_Y$ represents the threshold chosen for processing the luminance component Y, in the input JPEG image 104 under scrutiny at a given time.

Figure 4:
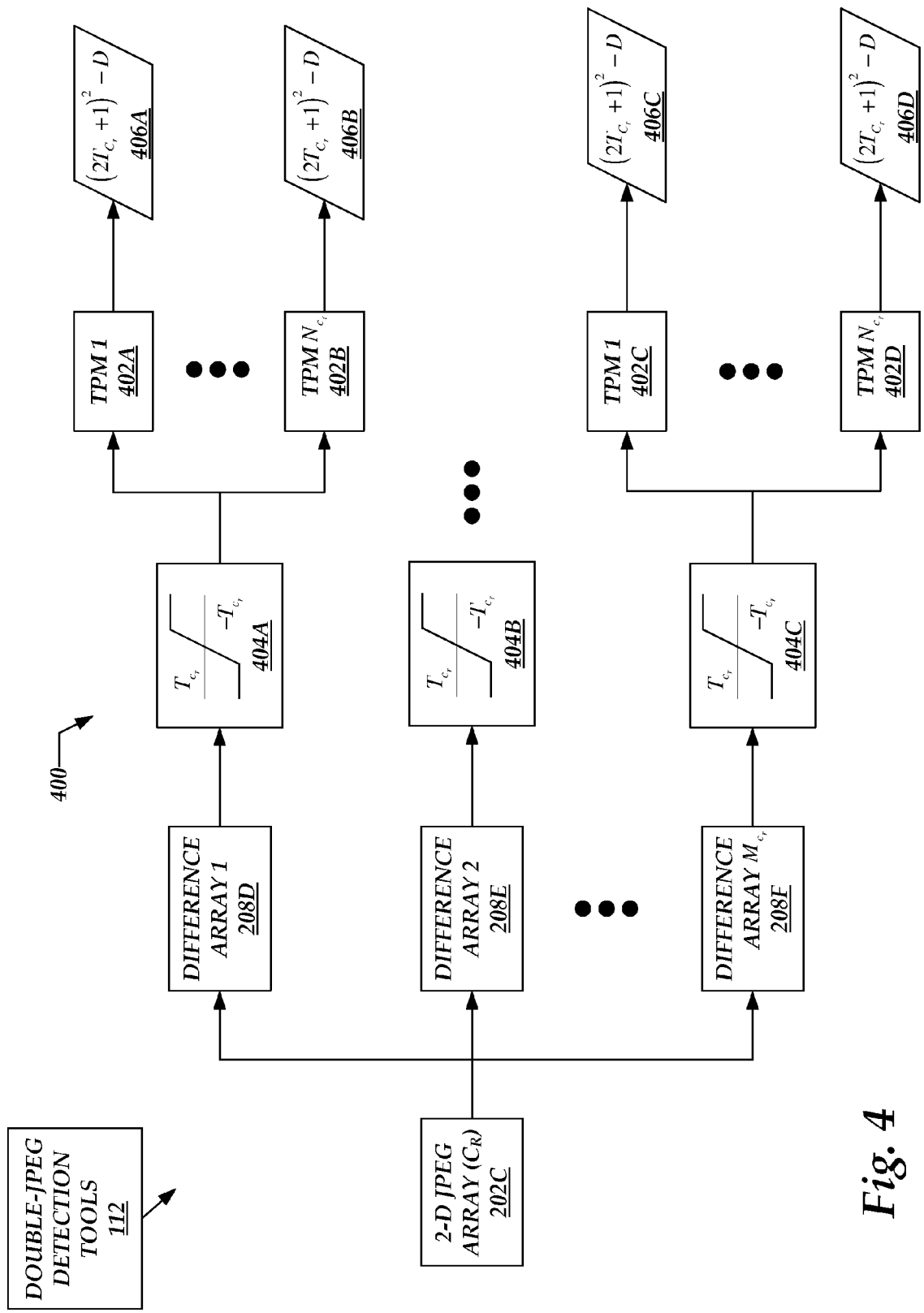
FIG. 4 is a block diagram illustrating example process operations that may be performed for an example chrominance component of the JPEG image.

FIG. 4 is a block diagram illustrating example process operations 400 that may be performed for example chrominance components $C_R$ of the JPEG image 104 in accordance with the present disclosure. The processes shown in FIG. 4 are similar to those shown in FIG. 3. However, because the process operations 400 operate on chrominance components rather than luminance components, FIG. 4 uses different reference numerals to refer to similar components and data flows. In addition, for conciseness of illustration and description, FIG. 4 illustrates the example process operations 400 in connection with the chrominance components $C_R$. However, implementations of this description may perform similar process operations for the chrominance components $C_B$. Therefore, the discussion directed here to the chrominance components $C_R$ are understood to apply equally to the chrominance components $C_B$.

FIG. 4 carries forward from FIG. 2 the 2-D JPEG coefficient array 202C for the chrominance component $C_R$, as well as the difference arrays 208D-208F generated from the JPEG array 202C. FIG. 4 illustrates example TPMs 402A-402D (collectively TPMs 402), along with related thresholding operations 404A-404C (collectively thresholding operations 404). More specifically, the thresholding operation 404A may be applied to the difference array 208D, the thresholding operation 404B may be applied to the difference array 208E, and the thresholding operation 404C may be applied to the difference array 208F. In addition, the TPMs 402A and 402B may be generated for the difference array 208D, and the TPMs 402C and 402D may be generated for the difference array 208F.

In FIGS. 2-4, several observations arise. First, FIG. 2 shows three difference arrays 208A-208C as associated with the 2-D JPEG array 206A, and three difference arrays 208D-208F as associated with the 2-D JPEG array 206C, but only for convenience of illustration and not to limit possible implementations. For example, any number of difference arrays 208 may be generated for a given JPEG coefficient array 206. In example implementations, the difference arrays 208 may be generated for different directions within the JPEG coefficient arrays 206 (e.g., horizontally, vertically, along major and/or minor diagonals). In addition, referring specifically to FIGS. 3 and 4, any number of TPMs 402 may be generated for the difference arrays 208, with the example TPMs 402 shown only to facilitate this description.

Figure 5:
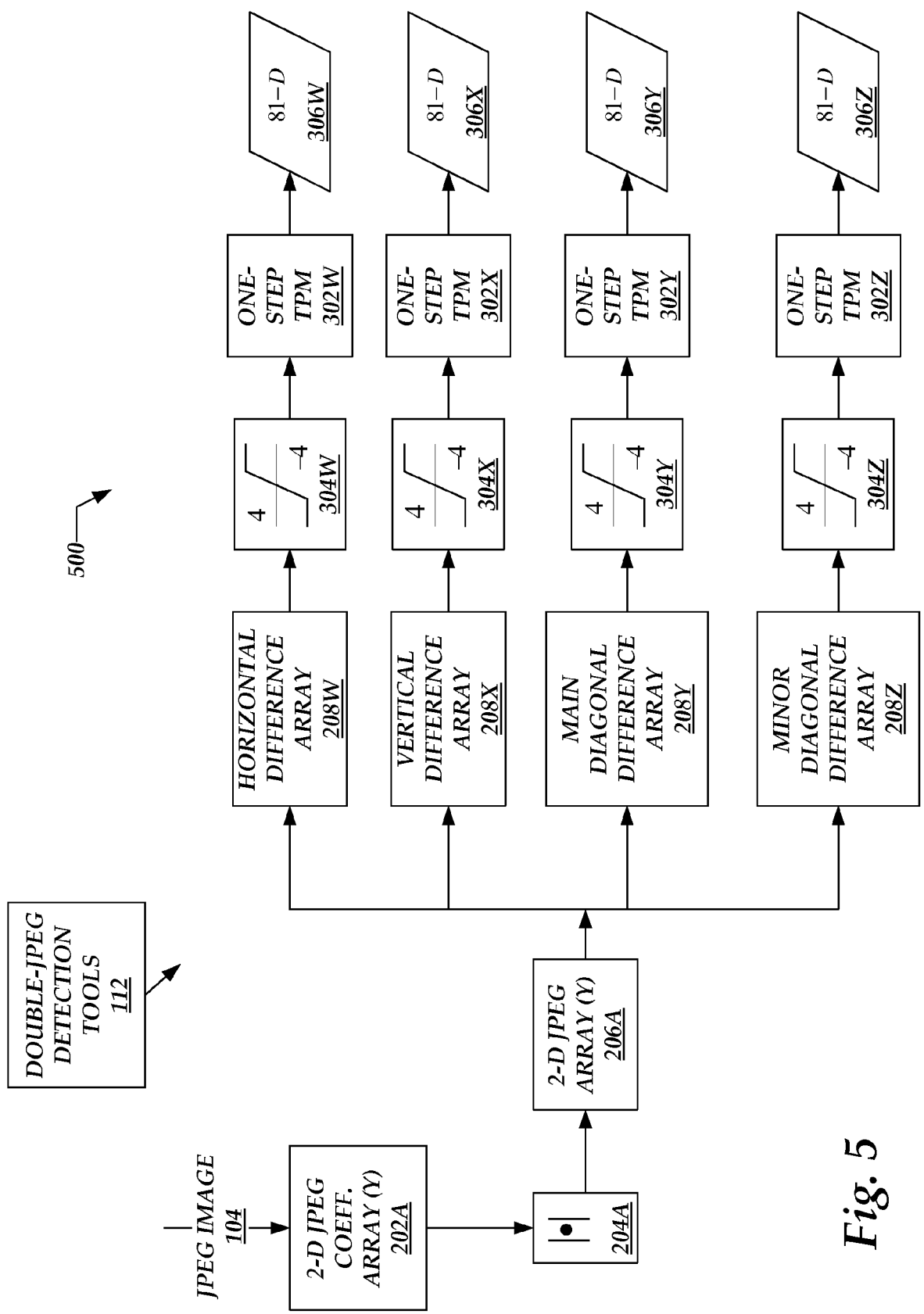
FIG. 5 is a block diagram illustrating more specific process operations that may be performed for the luminance component of the JPEG image.

FIG. 5 is a block diagram illustrating more specific process operations 500 that may be performed for the luminance component of the JPEG image 104 in accordance with the present disclosure. Accordingly, FIG. 5 carries forward an example of the image 104, and the 2-D JPEG coefficient array 202A for the luminance component Y of the image. In addition, FIG. 5 carries forward the absolute value operation 204A, which can be arranged to output magnitudes of the JPEG coefficient array 202A, which may be represented as the 2-D JPEG array 206A.

In the example implementations shown in FIG. 5, the double JPEG detection tools 112 may generate four different difference arrays for the 2-D JPEG array 206A. These four difference arrays may include a horizontal difference array 208W, a vertical difference array 208X, a main diagonal difference array 208Y, and a minor diagonal difference array 208Z.

Figure 7:
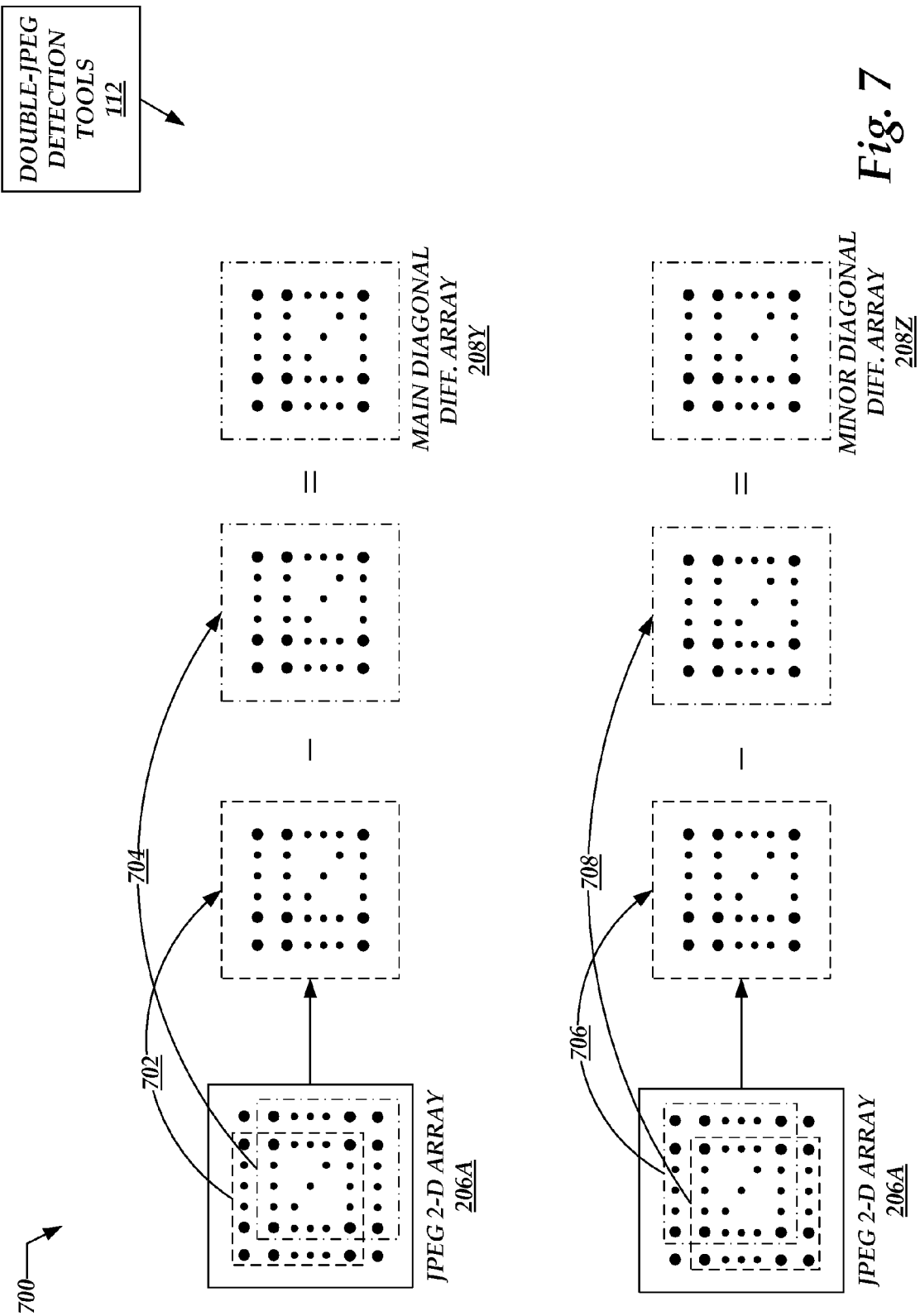

FIGS. 6 and 7 are block diagrams illustrating examples of generating horizontal, vertical, main diagonal, and minor diagonal difference arrays for the 2-D JPEG image, in accordance with the present disclosure. The discussion turns first to FIGS. 6 and 7, before returning to complete the description of FIG. 5.

FIG. 6 illustrates more particularly how a horizontal difference array 208W and a vertical difference array 208X may be generated from a 2-D JPEG array 206A. Assuming that the 2-D JPEG array 206A has dimensions Su×Sv, the difference arrays may have dimensions (Su−1)×(Sv−1). Turning first to the horizontal difference array 208W, beginning with the 2-D JPEG array 206A, a first set of N−1 elements within the 2-D array 206A are denoted at 602. A second set of N−1 elements within the array 206A are denoted at 604. Comparing the first set of elements 602 to the second set of elements 604, the element appearing at position (0, 1) in the first set of elements 602 corresponds to the element appearing at position (0, 0) in the second set of elements 604. As shown in FIG. 6, the second set of elements 604 may be horizontally displaced relative to the first set of elements 602.

The double JPEG detection tools 112 may calculate values within the horizontal difference array 208W by subtracting the values in the first of elements 602 from values in corresponding positions within the second set of elements 604. For example, the value in position (0, 0) within the horizontal difference array 208W represents the difference between the values in positions (0, 0) and (0, 1) within the first set of values 602. The double JPEG detection tools 112 may calculate the rest of the values within the horizontal difference array 208W in similar fashion.

Turning to the vertical difference array 208X, within the 2-D JPEG array 206A, a first set of elements within the array 206A is denoted at 606, and a second set of elements within the array 206A is denoted at 608. It is noted that the second set of elements 608 is effectively displaced vertically from the first set of elements 606. Accordingly, the value in position (0, 0) within the vertical difference array 208X represents the difference between the values in positions (0, 0) and (1, 0) within the first set of values 606. The double JPEG detection tools 112 may calculate the rest of the values within the vertical difference array 208X in similar fashion.

FIG. 7 illustrates more particularly how a main diagonal difference array 208Y and a minor diagonal difference array 208Z may be generated from a 2-D JPEG array 206A. Turning first to the main diagonal difference array 208Y, within the 2-D JPEG array 206A, a first set of elements within the array 206A is denoted at 702, and a second set of elements within the array 206A is denoted at 704. It is noted that the second set of elements 704 may be effectively displaced to the lower right from the first set of elements 702. Accordingly, the value in position (0, 0) within the main diagonal difference array 208Y represents the difference between the values in positions (0, 0) and (1, 1) within the first set of values 702. The double JPEG detection tools 112 may calculate the rest of the values within the main diagonal difference array 208Y in similar fashion.

Turning now to the minor diagonal difference array 208Z, within the 2-D JPEG array 206A, a first set of elements within the array 206A is denoted at 706, and a second set of elements within the array 206A is denoted at 708. It is noted that the second set of elements 708 may be effectively displaced to the lower left from the first set of elements 706. Accordingly, the value in position (0, 0) within the minor diagonal difference array 208Z represents the difference between the values in positions (0, 1) and (1, 0) within the first set of values 706. The double JPEG detection tools 112 may calculate the rest of the values within the minor diagonal difference array 208Z in similar fashion.

Generalizing the above examples, equations for calculating values within the horizontal difference arrays $F_h(u,v)$, vertical difference arrays $F_v(u,v)$, main diagonal difference arrays $F_d(u,v)$, and minor diagonal difference arrays $F_m(u,v)$, respectively, follow, denoted collectively as Equations 6):

$$F_h(u, v) = F(u, v) - F(u + 1, v)$$
$$F_v(u, v) = F(u, v) - F(u, v + 1)$$
$$F_d(u, v) = F(u, v) - F(u + 1, v + 1)$$
$$F_m(u, v) = F(u + 1, v) - F(u, v + 1)$$

(6)

Having described how the double JPEG detection tools 112 may calculate the horizontal, vertical, main diagonal, and minor diagonal difference arrays in FIGS. 6 and 7, the discussion now returns to completing the description of FIG. 5.

In order to achieve manageable computational complexity, the example implementations shown in FIG. 5 uses one-step transition probability matrices (TPMs), denoted at 302W-302Z, and associated respectively with the difference arrays 208W-208Z. In addition, the implementations shown in FIG. 5 apply thresholding operations 304W-304Z, with the threshold set to 4.

The elements of these four TPMs 302W-302Z as associated with the vertical, main diagonal, and minor diagonal difference JPEG 2-D arrays, respectively, may be given by the following, denoted collectively as Equations 7):

As described above, $\delta(A)$ represents the Kronecker delta function, where A is arbitrary input. If A is true, $\delta(A)$ outputs 1. Otherwise, $\delta(A)$ outputs 0.

As represented generally at 306W-306Z, features may be collected from the TPMs 302W-302Z as feature vectors. In turn, the double JPEG detection tools 112 may analyze these feature vectors to determine whether these features reveal artifacts associated with double JPEG compression.

Artifacts Caused by Double Compression

Theoretically, when an image is JPEG compressed using a first quantization step b from a first quantization step, followed by another quantization step a from a second quantization step, and if a/b is an integer, those JPEG coefficients of corresponding JPEG modes may generally be the same as those of a single JPEG compressed image with quantization step a. As a result, single and double quantized JPEG modes may have the same histogram, and therefore, in theory, it may be impossible to distinguish between them. In practice, double JPEG compression involves DCT, quantization (rounding included), dequantization, inverse DCT, rounding, one more DCT, and requantization (rounding included). JPEG compression is typically a lossy process, and therefore, rounding errors may be inevitable.

The tables below and the related discussion provide examples illustrating the occurrence of rounding errors. Table 2 provides quantization tables for quality factors 70 and 95. Afterwards, Table 3 illustrates an 8×8 image block experiencing a single JPEG compression with quality factor 70, and Table 4 illustrates a double JPEG compression with quality factor 95 followed by quality factor 70. The process of entropy coding is not discussed because it is lossless and can thus irrelevant to the present discussion.

$$p\{F_h(u+1, v) = n \mid F_h(u, v) = m\} = \frac{\sum_{v=0}^{S_v-2} \sum_{u=0}^{S_h-2} \delta(F_h(u, v) = m, F_h(u+1, v) = n)}{\sum_{v=0}^{S_v-2} \sum_{u=0}^{S_h-2} \delta(F_h(u, v) = m)},$$

$$p\{F_v(u, v+1) = n \mid F_v(u, v) = m\} = \frac{\sum_{v=0}^{S_v-2} \sum_{u=0}^{S_h-2} \delta(F_v(u, v) = m, F_v(u, v+1) = n)}{\sum_{v=0}^{S_v-2} \sum_{u=0}^{S_h-2} \delta(F_v(u, v) = m)},$$

$$p\{F_d(u+1, v+1) = n \mid F_d(u, v) = m\} = \frac{\sum_{v=0}^{S_v-2} \sum_{u=0}^{S_h-2} \delta(F_d(u, v) = m, F_d(u+1, v+1) = n)}{\sum_{v=0}^{S_v-2} \sum_{u=0}^{S_h-2} \delta(F_d(u, v) = m)},$$

$$p\{F_m(u, v+1) = n \mid F_m(u+1, v) = m\} = \frac{\sum_{v=0}^{S_v-2} \sum_{u=0}^{S_h-2} \delta(F_m(u+1, v) = m, F_m(u, v+1) = n)}{\sum_{v=0}^{S_v-2} \sum_{u=0}^{S_h-2} \delta(F_m(u+1, v) = m)}.$$

(7)

Where $$\delta(A) = \begin{cases} 1, & \text{if } A \text{ holds} \\ 0, & \text{Otherwise.} \end{cases}$$

TABLE 2

JPEG quantization tables: (a) quality factor = 70 and (b) quality factor = 95.

| 10 | 7 | 6 | 10 | 14 | 24 | 31 | 37 |
|---|---|---|---|---|---|---|---|
| 7 | 7 | 8 | 11 | 16 | 35 | 36 | 33 |
| 8 | 8 | 10 | 14 | 24 | 34 | 41 | 34 |
| 8 | 10 | 13 | 17 | 31 | 52 | 48 | 37 |
| 11 | 13 | 22 | 34 | 41 | 65 | 62 | 46 |
| 14 | 21 | 33 | 38 | 49 | 62 | 68 | 55 |
| 29 | 38 | 47 | 52 | 62 | 73 | 72 | 61 |
| 43 | 55 | 57 | 59 | 67 | 60 | 62 | 59 |

(a)

| 2 | 1 | 1 | 2 | 2 | 4 | 5 | 6 |
|---|---|---|---|---|---|---|---|
| 1 | 1 | 1 | 2 | 3 | 6 | 6 | 6 |
| 1 | 1 | 2 | 2 | 4 | 6 | 7 | 6 |
| 1 | 2 | 2 | 3 | 5 | 9 | 8 | 6 |
| 2 | 2 | 4 | 6 | 7 | 11 | 10 | 8 |
| 2 | 4 | 6 | 6 | 8 | 10 | 11 | 9 |
| 5 | 6 | 8 | 9 | 10 | 12 | 12 | 10 |
| 7 | 9 | 10 | 10 | 11 | 10 | 10 | 10 |

(b)

TABLE 3

An 8 × 8 block in a single JPEG compression process with quality factor 70: (a) the 8 × 8 block in the spatial domain; (b) shifted block, i.e., subtracted by 128; (c) block DCT coefficients; (d) divided by quantization steps (quality factor 70); and, (e) rounded coefficients, i.e., JPEG coefficients.

| 175 | 38 | 133 | 132 | 34 | 22 | 46 | 150 |
|---|---|---|---|---|---|---|---|
| 121 | 111 | 171 | 127 | 152 | 112 | 31 | 102 |
| 181 | 117 | 124 | 153 | 61 | 47 | 14 | 52 |
| 182 | 113 | 26 | 27 | 81 | 61 | 31 | 14 |
| 134 | 117 | 42 | 14 | 94 | 75 | 42 | 41 |
| 127 | 107 | 127 | 33 | 13 | 39 | 26 | 46 |
| 152 | 96 | 124 | 130 | 25 | 28 | 43 | 41 |
| 114 | 64 | 92 | 193 | 73 | 14 | 46 | 30 |

(a)

| 47 | −90 | 5 | 4 | −94 | −106 | −82 | 22 |
|---|---|---|---|---|---|---|---|
| −7 | −17 | 43 | −1 | 24 | −16 | −97 | −26 |
| 53 | −11 | −4 | 25 | −67 | −81 | −114 | −76 |
| 54 | −15 | −102 | −101 | −47 | −67 | −97 | −114 |
| 6 | −11 | −86 | −114 | −34 | −53 | −86 | −87 |
| −1 | −21 | −1 | −95 | −115 | −89 | −102 | −82 |
| 24 | −32 | −4 | 2 | −103 | −100 | −85 | −87 |
| −14 | −64 | −36 | 65 | −55 | −114 | −82 | −98 |

(b)

| −363.6 | 247.1 | 39.1 | −15.9 | 90.6 | 41.6 | 53.50 | −6.1 |
|---|---|---|---|---|---|---|---|
| 82.2 | −25.4 | 15.4 | −6.9 | 37.4 | −33.3 | 55.3 | 13.7 |
| 63.0 | −26.52 | −57.3 | −128.7 | 64.4 | 90.8 | 26.1 | −14.9 |
| −32.3 | −37.6 | 76.3 | −22.9 | −37.7 | −17.8 | 42.1 | 30.2 |
| −47.9 | −40.1 | 28.0 | 54.7 | 40.9 | 6.2 | −38.0 | 5.2 |
| −35.3 | 39.7 | 65.6 | −5.1 | 19.7 | 59.4 | 1.47 | −15.9 |
| −31.1 | 24.9 | 25.6 | −45.48 | 13.49 | 43.8 | 7.6 | −15.9 |
| 13.4 | 7.4 | 2.7 | −17.4 | 21.7 | 25.2 | −8.6 | −19.47 |

(c)

| −36.4 | 35.3 | 6.51 | −1.6 | 6.47 | 1.7 | 1.7 | −0.2 |
|---|---|---|---|---|---|---|---|
| 11.7 | −3.6 | 1.9 | −0.6 | 2.3 | −1.0 | 1.54 | 0.4 |
| 7.9 | −3.3 | −5.7 | −9.2 | 2.7 | 2.7 | 0.6 | −0.4 |
| −4.0 | −3.8 | 5.9 | −1.3 | −1.2 | −0.3 | 0.9 | 0.8 |
| −4.4 | −3.1 | 1.3 | 1.6 | 1.0 | 0.1 | −0.6 | 0.1 |
| −2.52 | 1.9 | 2.0 | −0.1 | 0.4 | 1.0 | 0.0 | −0.3 |
| −1.1 | 0.7 | 0.55 | −0.9 | 0.2 | 0.6 | 0.1 | −0.3 |
| 0.3 | 0.1 | 0.0 | −0.3 | 0.3 | 0.4 | −0.1 | −0.3 |

(d)

| −36 | 35 | 7 | −2 | 6 | 2 | 2 | 0 |
|---|---|---|---|---|---|---|---|
| 12 | −4 | 2 | −1 | 2 | −1 | 2 | 0 |
| 8 | −3 | −6 | −9 | 3 | 3 | 1 | 0 |
| −4 | −4 | 6 | −1 | −1 | 0 | 1 | 1 |
| −4 | −3 | 1 | 2 | 1 | 0 | −1 | 0 |
| −3 | 2 | 2 | 0 | 0 | 1 | 0 | 0 |
| −1 | 1 | 1 | −1 | 0 | 1 | 0 | 0 |
| 0 | 0 | 0 | 0 | 0 | 0 | 0 | 0 |

(e)

TABLE 4

The 8 × 8 block in Table 3(a) undergoing a double JPEG compression process with quality factor 95 followed by 70: (a) block DCT coefficients (the same as Table 3(c)); (b) divided by quantization steps (quality factor 95); (c) rounded coefficients, i.e., JPEG coefficients; (d) during decompression, multiplied by quantization steps (quality factor 95); (e) inverse DCT transformed; (f) decompressed image in spatial domain, which is rounded, back shifted, and truncated; (g) shifted block, i.e., subtracted by 128; (h) block DCT coefficients; (i) divided by quantization steps (quality factor 70); and, (j) rounded coefficients, i.e., JPEG coefficients.

| −363.6 | 247.1 | 39.1 | −15.9 | 90.6 | 41.6 | 53.50 | −6.1 |
|---|---|---|---|---|---|---|---|
| 82.2 | −25.4 | 15.4 | −6.9 | 37.4 | −33.3 | 55.3 | 13.7 |
| 63.0 | −26.52 | −57.3 | −128.7 | 64.4 | 90.8 | 26.1 | −14.9 |
| −32.3 | −37.6 | 76.3 | −22.9 | −37.7 | −17.8 | 42.1 | 30.2 |
| −47.9 | −40.1 | 28.0 | 54.7 | 40.9 | 6.2 | −38.0 | 5.2 |
| −35.3 | 39.7 | 65.6 | −5.1 | 19.7 | 59.4 | 1.47 | −15.9 |
| −31.1 | 24.9 | 25.6 | −45.48 | 13.49 | 43.8 | 7.6 | −15.9 |
| 13.4 | 7.4 | 2.7 | −17.4 | 21.7 | 25.2 | −8.6 | −19.47 |

(a)

| −181.8 | 247.1 | 39.1 | −8.0 | 45.3 | 10.4 | 10.7 | −1.0 |
|---|---|---|---|---|---|---|---|
| 82.2 | −25.4 | 15.4 | −3.45 | 12.46 | −5.6 | 9.2 | 2.3 |
| 63.0 | −26.52 | −28.7 | −64.4 | 16.1 | 15.1 | 3.7 | −2.49 |
| −32.3 | −18.8 | 38.1 | −7.6 | −7.53 | −2.0 | 5.3 | 5.0 |
| −23.9 | −20.1 | 7.0 | 9.1 | 5.8 | 0.6 | −3.8 | 0.7 |
| −17.6 | 9.9 | 10.9 | −0.8 | 2.46 | 5.9 | 0.1 | −1.8 |
| −6.2 | 4.2 | 3.2 | −5.1 | 1.3 | 3.7 | 0.6 | −1.6 |
| 1.9 | 0.8 | 0.3 | −1.7 | 2.0 | 2.52 | −0.9 | −1.9 |

TABLE 4-continued

The 8 × 8 block in Table 3(a) undergoing a double JPEG compression process with quality factor 95 followed by 70: (a) block DCT coefficients (the same as Table 3(c)); (b) divided by quantization steps (quality factor 95); (c) rounded coefficients, i.e., JPEG coefficients; (d) during decompression, multiplied by quantization steps (quality factor 95); (e) inverse DCT transformed; (f) decompressed image in spatial domain, which is rounded, back shifted, and truncated; (g) shifted block, i.e., subtracted by 128; (h) block DCT coefficients; (i) divided by quantization steps (quality factor 70); and, (j) rounded coefficients, i.e., JPEG coefficients.

(b)

| | | | | | | | |
|---|---|---|---|---|---|---|---|
| −182 | 247 | 39 | −8 | 45 | 10 | 11 | −1 |
| 82 | −25 | 15 | −3 | 12 | −6 | 9 | 2 |
| 63 | −27 | −29 | −64 | 16 | 15 | 4 | −2 |
| −32 | −19 | 38 | −8 | −8 | −2 | 5 | 5 |
| −24 | −20 | 7 | 9 | 6 | 1 | −4 | 1 |
| −18 | 10 | 11 | −1 | 2 | 6 | 0 | −2 |
| −6 | 4 | 3 | −5 | 1 | 4 | 1 | −2 |
| 2 | 1 | 0 | −2 | 2 | 3 | −1 | −2 |

(c)

| | | | | | | | |
|---|---|---|---|---|---|---|---|
| −364 | 247 | 39 | −16 | 90 | 40 | 55 | −6 |
| 82 | −25 | 15 | −6 | 36 | −36 | 54 | 12 |
| 63 | −27 | −58 | −128 | 64 | 90 | 28 | −12 |
| −32 | −38 | 76 | −24 | −40 | −18 | 40 | 30 |
| −48 | −40 | 28 | 54 | 42 | 11 | −40 | 8 |
| −36 | 40 | 66 | −6 | 16 | 60 | 0 | −18 |
| −30 | 24 | 24 | −45 | 10 | 48 | 12 | −20 |
| 14 | 9 | 0 | −20 | 22 | 30 | −10 | −20 |

(d)

| | | | | | | | |
|---|---|---|---|---|---|---|---|
| 45.2 | −89.2 | 6.3 | 3.8 | −95.0 | −105.1 | −80.4 | 20.2 |
| −6.9 | −15.3 | 41.2 | −5.3 | 28.53 | −16.3 | −100.6 | −23.8 |
| 52.53 | −11.2 | −3.0 | 27.49 | −69.9 | −77.2 | −115.8 | −76.9 |
| 54.0 | −13.52 | −104.0 | −102.8 | −47.46 | −67.8 | −97.1 | −113.4 |
| 6.6 | −11.9 | −85.6 | −110.9 | −33.53 | −56.6 | −84.53 | −87.54 |
| −2.1 | −20.3 | −0.54 | −96.3 | −116.8 | −84.6 | −103.1 | −80.9 |
| 22.8 | −30.6 | −3.46 | 1.1 | −102.6 | −101.9 | −85.4 | −86.9 |
| −11.8 | −68.7 | −33.9 | 64.3 | −54.0 | −114.0 | −82.0 | −97.6 |

(e)

| | | | | | | | |
|---|---|---|---|---|---|---|---|
| 173 | 39 | 134 | 132 | 33 | 23 | 48 | 148 |
| 121 | 113 | 169 | 123 | 157 | 112 | 27 | 104 |
| 181 | 117 | 125 | 155 | 58 | 51 | 12 | 51 |
| 182 | 114 | 24 | 25 | 81 | 60 | 31 | 15 |
| 135 | 116 | 42 | 17 | 94 | 71 | 43 | 40 |
| 126 | 108 | 127 | 32 | 11 | 43 | 25 | 47 |
| 151 | 97 | 125 | 129 | 25 | 26 | 43 | 41 |
| 116 | 59 | 94 | 192 | 74 | 14 | 46 | 30 |

(f)

| | | | | | | | |
|---|---|---|---|---|---|---|---|
| 45 | −89 | 6 | 4 | −95 | −105 | −80 | 20 |
| −7 | −15 | 41 | −5 | 29 | −16 | −101 | −24 |
| 53 | −11 | −3 | 27 | −70 | −77 | −116 | −77 |
| 54 | −14 | −104 | −103 | −47 | −68 | −97 | −113 |
| 7 | −12 | −86 | −111 | −34 | −57 | −85 | −88 |
| −2 | −20 | −1 | −96 | −117 | −85 | −103 | −81 |
| 23 | −31 | −3 | 1 | −103 | −102 | −85 | −87 |
| −12 | −69 | −34 | 64 | −54 | −114 | −82 | −98 |

(g)

| | | | | | | | |
|---|---|---|---|---|---|---|---|
| −364.4 | 247.2 | 39.1 | −15.6 | 90.1 | 40.2 | 54.8 | −6.0 |
| 82.47 | −25.1 | 14.8 | −5.7 | 36.1 | −36.53 | 53.9 | 11.7 |
| 63.2 | −27.3 | −58.47 | −127.9 | 63.47 | 90.1 | 27.8 | −12.1 |
| −32.0 | −37.8 | 76.1 | −24.2 | −39.9 | −17.6 | 39.3 | 29.52 |
| −48.4 | −40.3 | 27.9 | 54.0 | 42.1 | 11.0 | −40.1 | 8.2 |
| −35.6 | 39.4 | 66.3 | −6.3 | 15.8 | 60.4 | 0.2 | −17.48 |
| −30.1 | 24.1 | 24.3 | −44.8 | 9.8 | 47.8 | 11.7 | −20.2 |
| 13.7 | 9.53 | 0.4 | −19.8 | 21.6 | 30.3 | −9.6 | −20.1 |

(h)

| | | | | | | | |
|---|---|---|---|---|---|---|---|
| −36.4 | 35.3 | 6.51 | −1.6 | 6.4 | 1.7 | 1.8 | −0.2 |
| 11.8 | −3.6 | 1.8 | −0.52 | 2.3 | −1.0 | 1.50 | 0.4 |
| 7.9 | −3.4 | −5.8 | −9.1 | 2.6 | 2.6 | 0.7 | −0.4 |
| −4.0 | −3.8 | 5.9 | −1.4 | −1.3 | −0.3 | 0.8 | 0.8 |
| −4.4 | −3.1 | 1.3 | 1.6 | 1.0 | 0.2 | −0.6 | 0.2 |
| −2.55 | 1.9 | 2.0 | −0.2 | 0.3 | 1.0 | 0.0 | −0.3 |
| −1.0 | 0.6 | 0.52 | −0.9 | 0.2 | 0.7 | 0.2 | −0.3 |
| 0.3 | 0.2 | 0.0 | −0.3 | 0.3 | 0.51 | −0.2 | −0.3 |

TABLE 4-continued

The 8 × 8 block in Table 3(a) undergoing a double JPEG compression process with quality factor 95 followed by 70: (a) block DCT coefficients (the same as Table 3(c)); (b) divided by quantization steps (quality factor 95); (c) rounded coefficients, i.e., JPEG coefficients; (d) during decompression, multiplied by quantization steps (quality factor 95); (e) inverse DCT transformed; (f) decompressed image in spatial domain, which is rounded, back shifted, and truncated; (g) shifted block, i.e., subtracted by 128; (h) block DCT coefficients; (i) divided by quantization steps (quality factor 70); and, (j) rounded coefficients, i.e., JPEG coefficients.

(i)

| | | | | | | | |
|---|---|---|---|---|---|---|---|
| −36 | 35 | 7 | −2 | 6 | 2 | 2 | 0 |
| 12 | −4 | 2 | −1 | 2 | −1 | *1* | 0 |
| 8 | −3 | −6 | −9 | 3 | 3 | 1 | 0 |
| −4 | −4 | 6 | −1 | −1 | 0 | 1 | 1 |
| −4 | −3 | 1 | 2 | 1 | 0 | −1 | 0 |
| −3 | 2 | 2 | 0 | 0 | 1 | 0 | 0 |
| −1 | 1 | 1 | −1 | 0 | 1 | 0 | 0 |
| 0 | 0 | 0 | 0 | 0 | *1* | 0 | 0 |

(j)

Comparing Tables 3 and 4, it is noted that the two italicized numbers in Table 3(e) are different from those in the same positions in Table 4(j), although a/b is an integer in these cases. Clearly, owing to the rounding errors caused by DCT, quantization, and inverse DCT, the 8×8 block in Table 4(f), which is the result of recovering the image block from a JPEG compression to the spatial domain, has been different from that in Table 3(a), which is the image block before JPEG compression. In other words, the image block before the second JPEG compression in the double JPEG compression process is different from that before the single JPEG compression. As a result, the double JPEG compressed image block is different from the single JPEG image block in JPEG domain.

The above example indicates that although the corresponding JPEG coefficients should have not changed when a/b is an integer, in practice, some changes have happened. These changes are examples of the artifacts that may result from double JPEG compression. Other examples of statistical artifacts may include weaker than expected correlation between different elements in the difference array or arrays.

Figure 8:
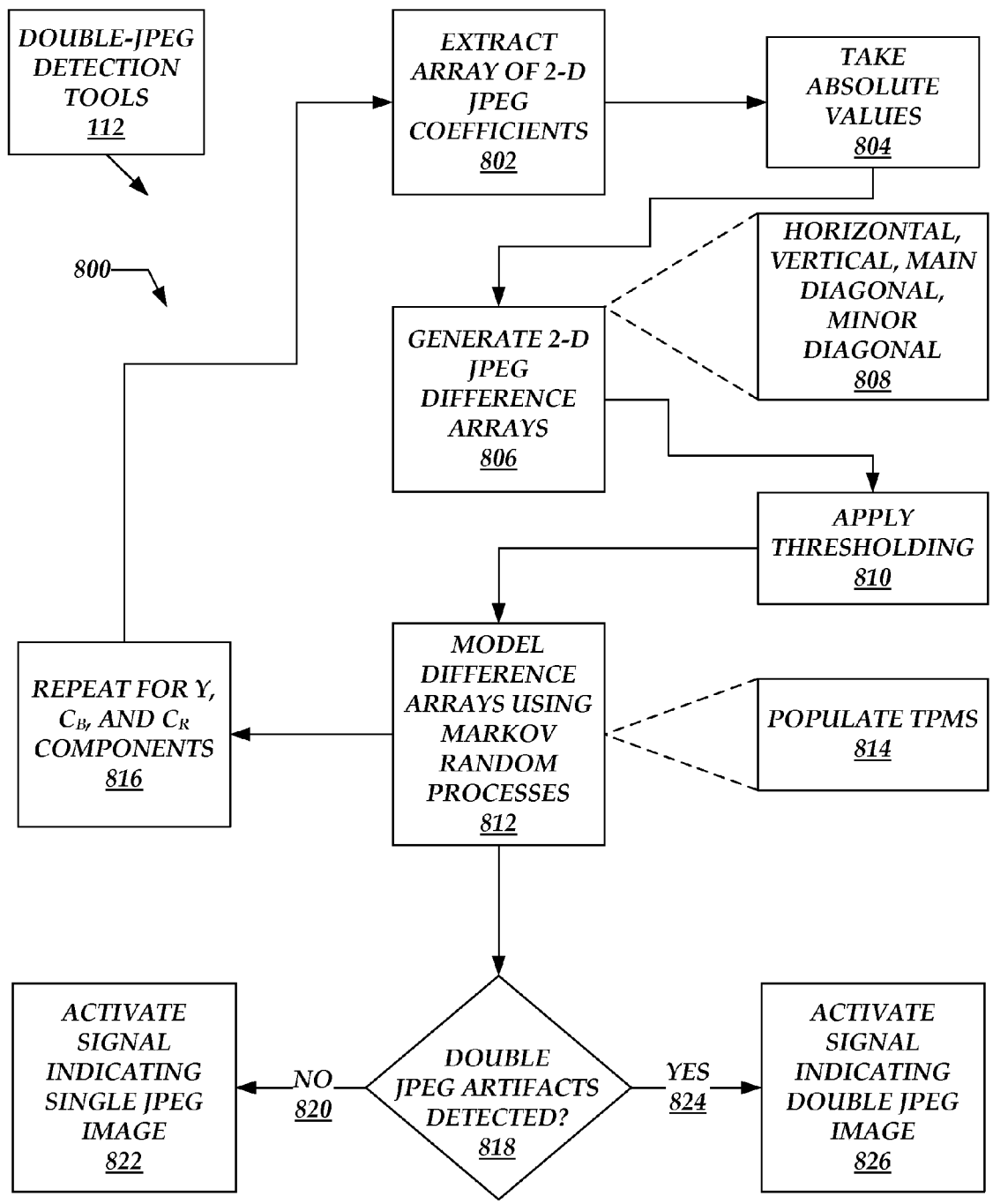
FIG. 8 is a flow diagram illustrating example processes for detecting double JPEG compression in images.

FIG. 8 is a flow diagram illustrating example processes, denoted generally at 800, for detecting double JPEG compression in images, in accordance with the present disclosure. Without limiting possible implementations, the processes 800 are generally described in connection with the double JPEG detection tools 112. However, it is noted that implementations of this description may perform at least part of the processes 800 using other components or operations, without departing from the scope and spirit of this description.

Turning to the processes 800 in more detail, block 802 represents operations for extracting an array of 2-D JPEG coefficients from a given input JPEG image. FIG. 1 provides examples of an input JPEG image at 104, and FIG. 2 provides examples of the JPEG coefficient arrays at 202A-202C.

In some implementations of the processes 800, block 804 represents operations for taking the absolute values of the JPEG coefficients extracted in block 802. In this manner, subsequent processing may operate only on the magnitudes of the JPEG coefficients, without regard to the sign of these coefficients.

Block 806 represents operations for generating 2-D JPEG difference arrays, based on the values of the 2-D JPEG coefficients extracted in block 802. FIG. 5 illustrates four non-limiting examples of JPEG difference arrays at 208W-208Z, representing respectively horizontally, vertical, main diagonal, and minor diagonal difference arrays. Block 806 may include operations for generating one or more of these difference arrays, as represented generally at block 808. However, it is noted that implementations of this description may include difference arrays of one or more of these types, or possibly other types without departing from the scope and spirit of this description.

As represented generally at block 810, some implementations of the processes 800 may include operations for thresholding values in the difference arrays, to promote computational efficiency. For example, FIG. 3 provides examples of thresholding operations at 304A-304C, and FIGS. 4 and 5 provide similar examples of thresholding operations.

Block 812 generally represents operations for modeling the difference arrays using random processes. In example implementations, these random processes may be Markov processes. More specifically, block 812 may include populating one or more transition probability matrices (TPMs), as represented generally at 814. Examples of these TPMs appear above in FIGS. 3-5 at 302 and 402.

As noted above, color JPEG images may include a luminance component and two chrominance components. Grayscale JPEG images generally include only the luminance component. Depending on the type of a given input JPEG image, blocks 802-812 may be repeated as appropriate for the luminance and/or chrominance components within the input JPEG image, as represented generally by block 816. In the interest of clarity, FIG. 8 omits any testing logic or testing operations for determining when all appropriate luminance and/or chrominance components have been processed.

Once the operations of blocks 802-812 have been performed to process the appropriate luminance and/or chrominance components of the input JPEG image, block 818 represents operation for evaluating whether statistical artifacts resulting from double JPEG compression are detected within the TPMs generated in block 812. As discussed above, examples of these statistical artifacts may include unexpected anomalies or deviations resulting from rounding errors that occur during double JPEG compression. More specifically, these rounding errors may result from discrete cosine transform (DCT), quantization, and inverse DCT operations performed during double JPEG compression. Additionally, these double compression artifacts may result even when a/b is an integer (recalling that a and b represent respective quantization steps performed in the double JPEG compressions).

From decision block 818, if no artifacts are detected by the operations in block 818, then the processes 800 may take "No" branch 820 to block 822. Block 822 represents operations for activating or asserting a signal indicating that the input image is most likely a single JPEG image. FIG. 1 provides an example of such a signal at 114.

Returning once again to decision block 818, if artifacts are detected by the operations in block 818, then the processes 800 may take "Yes" branch 824 to block 826. Block 826 represents operations for activating or asserting a signal indicating that the input image is most likely a double JPEG image. FIG. 1 provides an example of such a signal at 116.

Implementations of the above description may perform a two-class pattern recognition on the input JPEG image 104, generating output signals that classify this input image as a single JPEG image (e.g., 114) or a double JPEG image (e.g., 116). Accordingly, implementations of this description may employ any classifier suitable for two-class pattern recognition to fulfill this classification task. As one possible, but non-limiting, example, some implementations of this description may use the support vector machine (SVM) as the classifier. The MATLAB code for the SVM is publicly available, and may be downloaded from the Internet. The SVM provides four basic kernels: Linear, Polynomial, Radial Basis Function (RBF), and Sigmoid. Some implementations of this description may use the Polynomial kernel with degree two.

Exemplary Computing Systems

Figure 9:
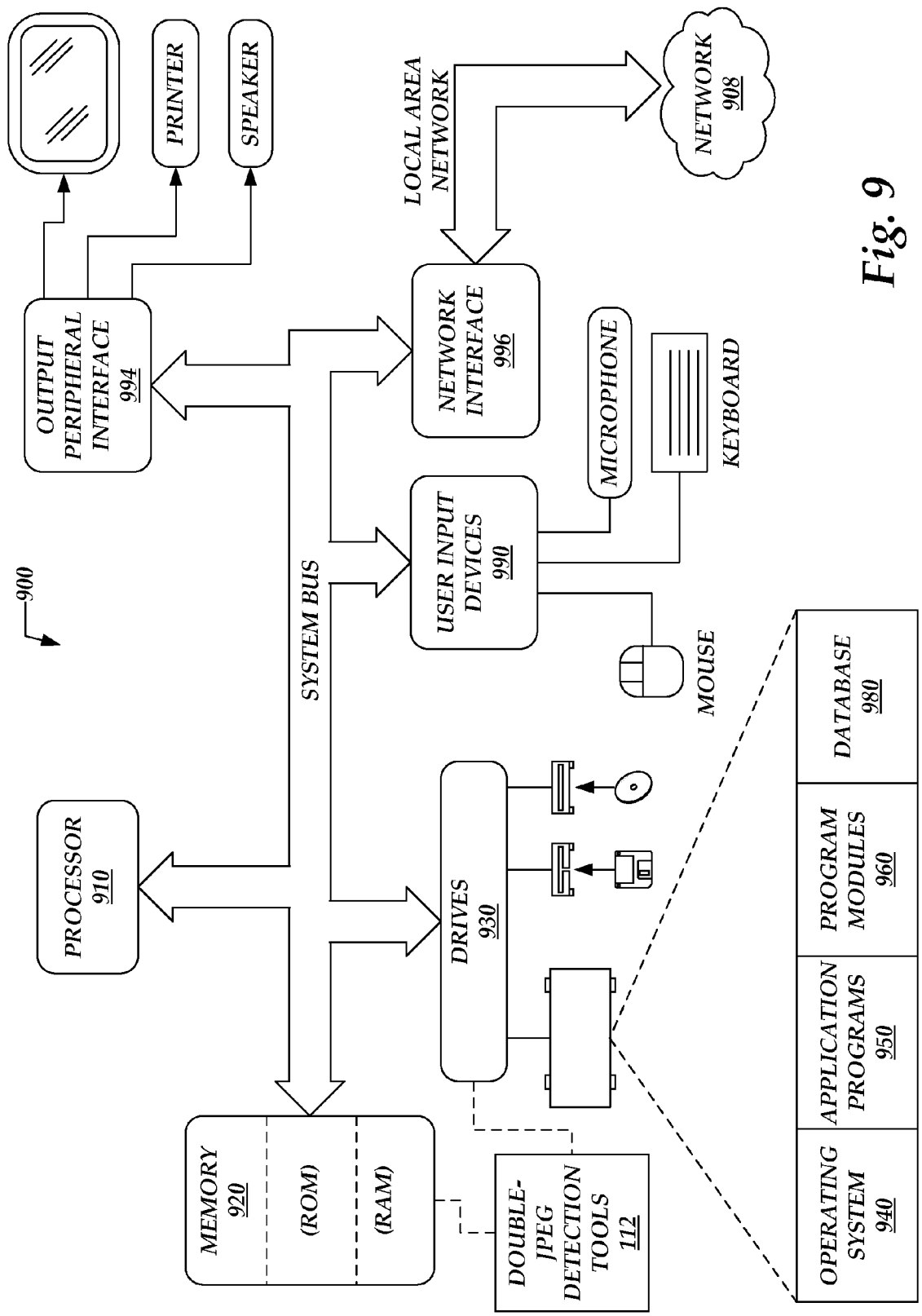
FIG. 9 is a schematic diagram illustrating an example computing system for implementing embodiments of, for example, a system for detecting double JPEG images as shown in FIG. 1, all arranged in accordance with the present disclosure

FIG. 9 is a schematic diagram illustrating an example computing system 900 for implementing embodiments of, for example, the double JPEG detection system 102 shown in FIG. 1. Computing system 900 may also be referred to as a computer, a computer device, or a computing device. Computer system 900 may include a processor 910, memory 920 and one or more drives 930. The drives 930 and their associated computer storage media, may be arranged to provide storage of computer readable instructions, data structures, program modules and other data for the computer system 900. At different times during operation of the computing system 900, software modules constituting the tools 112 for detecting double-JPEG images may be stored in the memory 920, the processor 910, and/or the drives 930. Drives 930 may include one or more of an operating system 940, application programs 950, program modules 960, or databases 980. The tools 112 may include software modules provided as part of application programs 950 and/or the program modules 960. Computer system 900 may further includes user input devices 990 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be coupled to processor 910 through a user input interface that may be coupled to a system bus, or may be coupled by other interface and bus structures, such as a parallel port, game port or a universal serial bus (USB). Computers such as computer system 900 may also include other peripheral output devices such as speakers, which may be coupled through an output peripheral interface 994 or the like.

Computer system 900 may operate in a networked environment using logical connections to one or more computers, such as a remote computer coupled to network interface 996. The remote computer may be a personal computer (PC), a server, a router, a network PC, a peer device or other common network node, and can include many or all of the elements described above relative to computer system 900. Networking environments are commonplace in offices, enterprise-wide area networks (WAN), local area networks (LAN), wireless LANs (WLAN), intranets and world-wide networks such as the Internet. For example, in the subject matter of the present disclosure, computer system 900 may comprise the source machine from which data is being migrated, and the remote computer may comprise the destination machine or vice versa. Note however, that source and destination machines need not be connected by a network 908 or any other means, but instead, data may be migrated via any media capable of being written by the source platform and read by the destination platform or platforms. When used in a LAN or WLAN networking environment, computer system 900 may be coupled to the LAN through a network interface 996 or an adapter. When used in a WAN networking environment, computer system 900 may include a modem or other means for establishing communications over the WAN, such as the Internet or network 908 It will be appreciated that other means of establishing a communications link between the various computer systems and device may be used.

According to one embodiment, computer system 900 may be coupled in a networking environment such that the processor 910 and/or program modules 960 can perform with or as a system for detecting double JPEG compression in images in accordance with embodiments herein.

CONCLUSION

It will be appreciated that the foregoing description provides processes, systems, components, and computer readable storage media (collectively, tools and/or techniques) may affect various transformations in representations of physical items. For example, the double JPEG detection system 102 may be implemented as a general-purpose computer similar to that shown in FIG. 9. However, by downloading and executing software implementations of these tools (e.g., double JPEG detection tools 112 shown in FIG. 1), this general-purpose computer system may transition or be transformed into a special-purpose computer suitable for performing steganalysis of suspect media. In turn, this special-purpose computer may process and analyze particular instances of such suspect media, and transform representations of the suspect media into corresponding output signals characterizing the suspect media as double JPEG-compressed media.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or processes, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application.

The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computer-readable storage medium storing computer-executable instructions to process a JPEG image, the computer-executable instructions comprising:
   receiving the JPEG image for analysis;
   extracting a 2-dimensional (2-D) array of JPEG coefficients from the JPEG image;
   generating a 2-D difference array based on the 2-D array of JPEG coefficients, wherein entries in the 2-D difference array reflect relative changes in values of pairs of entries in the 2-D array of JPEG coefficients;
   modeling the 2-D difference arrays using a Markov random process; and
   evaluating whether the random process reveals statistical artifacts in the JPEG image, the statistical artifacts resulting from double JPEG impression performed on the JPEG image.

2. The computer-readable storage medium of claim 1, the extracting the 2-D array of JPEG coefficients instructions comprising extracting a 2-D array of JPEG coefficients for a luminance component of the JPEG image.

3. The computer-readable storage medium of claim 1, the extracting the 2-D array of JPEG coefficients instructions comprising extracting the 2-D array of JPEG coefficients for at least one chrominance component of the JPEG image.

4. The computer-readable storage medium of claim 1, the generating the 2-D difference array instructions comprising generating a horizontal difference array, wherein the horizontal difference array reflects relative changes in values between pairs of horizontally-related elements appearing in the 2-D array of JPEG coefficients.

5. The computer-readable storage medium of claim 1, the generating the 2-D difference array instructions comprising generating a vertical difference array, wherein the vertical difference array reflects relative changes in values between pairs of vertically-related elements appearing in the 2-D array of JPEG coefficients.

6. The computer-readable storage medium of claim 1, the generating the 2-D difference array instructions comprising generating a main diagonal difference array, wherein the main diagonal difference array reflects relative changes in values between pairs of elements appearing along a main diagonal in the 2-D array of JPEG coefficients.

7. The computer-readable storage medium of claim 1, the generating the 2-D difference array instructions comprising generating a minor diagonal difference array, wherein the minor diagonal difference array reflects relative changes in values between pairs of elements appearing along a minor diagonal in the 2-D array of JPEG coefficients.

8. The computer-readable storage medium of claim 1, the instructions further comprising applying thresholding to elements in the 2-D difference array before modeling the 2-D difference arrays using the Markov random process.

9. The computer-readable storage medium of claim 1, the instructions further comprising computing absolute values of elements in the 2-D array of JPEG coefficients.

10. The computer-readable storage medium of claim 1, the instructions further comprising populating a transition probability matrix for the 2-D difference array, wherein entries in the transition probability matrix represent probabilities of values of first elements in the 2-D difference array transitioning to values of second elements in the difference array.

11. The computer-readable storage medium of claim 1, the instructions further comprising detecting statistical artifacts of double JPEG compression in the JPEG image.

12. The computer-readable storage medium of claim 11, the detecting statistical artifacts instructions comprising detecting rounding errors that occur during the double JPEG compression.

13. The computer-readable storage medium of claim 11, the detecting statistical artifacts instructions comprising detecting weakened statistical correlation between a plurality of elements in the 2-D difference array.

14. The computer-readable storage medium of claim 11, the detecting statistical artifacts instructions comprising detecting statistical artifacts resulting from a first JPEG compression of the JPEG image using a first quantization factor from a first quantization step, and a second quantization factor from a second quantization step, wherein the ratio of the first and second quantization factors is an integer.

15. The computer-readable storage medium of claim 1, the instructions further comprising asserting a signal indicating that the JPEG image is a double JPEG image.

16. The computer-readable storage medium of claim 1, the instructions further comprising asserting a signal indicating that the JPEG image is a single JPEG image.

17. A system for processing a JPEG image comprising:
a computer readable storage medium storing computer-executable instructions for processing the JPEG image;
a processor that is configured by the computer executable instructions to:
 receive the JPEG image for analysis;
 extract a 2-dimensional (2-D) array of JPEG coefficients from the JPEG image;
 generate a 2-D difference array based on the 2-D array of JPEG coefficients, wherein entries in the 2-D difference array reflect relative changes in values of pairs of entries in the 2-D array of JPEG coefficients;
 model the 2-D difference arrays using a random process; and
 evaluate whether the random process reveals statistical artifacts in the JPEG image, the statistical artifacts resulting from double JPEG impression performed on the JPEG image.

18. The system of claim 17, wherein the processor is further configured by the computer-executable instructions to extract the 2-D array of JPEG coefficients for a luminance component of the JPEG image.

19. The system of claim 17, processor is further configured by the computer-executable instructions to extract the 2-D array of JPEG coefficients for at least one chrominance component of the JPEG image.

20. A computer-implemented method for processing a JPEG image, the method comprising:
receiving the JPEG image for analysis to determine whether the JPEG image exhibits statistical artifacts associated with double JPEG compression;
extracting a 2-dimensional (2-D) array of JPEG coefficients from the JPEG image;
generating a plurality of 2-D difference arrays based on the array of JPEG coefficients, wherein the 2-D difference arrays include a first difference array and a second difference array, wherein entries in the first difference array reflect relative changes in values of pairs of entries in the 2-D array of JPEG coefficients taken along a first dimension of the JPEG image, and wherein entries in the second difference array reflect relative changes in values of pairs of entries in the 2-D array of JPEG coefficients taken along a further dimension of the JPEG image;
applying thresholding to elements within the plurality of 2-D difference arrays;
modeling thresholded elements of the 2-D difference arrays using a random process; and
evaluating whether the random process reveals statistical artifacts in the JPEG image, the statistical artifacts resulting from double JPEG impression performed on the JPEG image.

* * * * *

UNITED STATES PATENT AND TRADEMARK OFFICE
CERTIFICATE OF CORRECTION

PATENT NO. : 8,200,034 B2
APPLICATION NO. : 12/422683
DATED : June 12, 2012
INVENTOR(S) : Shi et al.

It is certified that error appears in the above-identified patent and that said Letters Patent is hereby corrected as shown below:

On the Face page, in the figure, in Box "816", Line 2, delete "$C_B$," insert -- $C_B$ --, therefor.

In Fig. 8, Sheet 8 of 9, in Box "816", Line 2, delete "$C_B$," and insert -- $C_B$ --, therefor.

In Column 1, Line 51, delete "disclosure" and insert -- disclosure. --, therefor.

In Column 3, Line 62, delete "$C_b$ and $C_r$." and insert -- $C_B$ and $C_R$. --, therefor.

In Column 6, Line 2, delete "208b." and insert -- 208B. --, therefor.

In Column 9, Line 5, delete "image." and insert -- image). --, therefor.

In Column 20, Lines 2-3, delete "(WAN), local ared networks (LAN), wireless LANs (WLAN)," and insert -- (WANs), local area networks (LANs), wireless LANs (WLANs), --, therefor.

In Column 24, Line 15, in Claim 19, delete "claim 17," and insert -- claim 17, wherein the --, therefor.

Signed and Sealed this
Twenty-fifth Day of September, 2012

David J. Kappos
*Director of the United States Patent and Trademark Office*